under 35 U.S.C. 154(b) by 947 days.

(12) United States Patent
Filkins et al.

(10) Patent No.: US 7,039,362 B2
(45) Date of Patent: May 2, 2006

(54) WIRELESS TRANSCEIVER AND METHOD FOR REMOTE ULTRASONIC MEASUREMENTS

(75) Inventors: Robert John Filkins, Niskayuna, NY (US); Carl Stephen Lester, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 947 days.

(21) Appl. No.: 09/682,618

(22) Filed: Sep. 27, 2001

(65) Prior Publication Data
US 2003/0060163 A1    Mar. 27, 2003

(51) Int. Cl.
*H04B 17/00* (2006.01)
(52) U.S. Cl. .................... 455/67.11; 455/423
(58) Field of Classification Search ............ 455/67.11, 455/67.15, 423; 367/95, 103, 104
See application file for complete search history.

(56) References Cited

U.S. PATENT DOCUMENTS

| 4,500,977 A | * | 2/1985 | Gelhard ................ 367/108 |
| 5,440,937 A | * | 8/1995 | Lynnworth et al. ....... 73/861.29 |
| 5,808,200 A | | 9/1998 | Dam |
| 5,959,284 A | | 9/1999 | La et al. |
| 5,963,882 A | | 10/1999 | Viertl et al. |
| 6,092,420 A | | 7/2000 | Kimura et al. |
| 6,158,288 A | * | 12/2000 | Smith ................ 73/861.25 |

* cited by examiner

*Primary Examiner*—Bing Q. Bui
(74) *Attorney, Agent, or Firm*—Penny A. Clarke; Patrick K. Patnode

(57) ABSTRACT

A wireless transceiver for performing ultrasonic measurements includes an uplink transmitter configured to transmit at least one modulated timing pulse signal. Each modulated timing pulse signal is transmitted over a respective uplink wireless channel. The transceiver further includes at least one uplink receiver, which is adapted to receive a respective one of the modulated timing pulse signals from the uplink transmitter and configured to supply an unmodulated timing pulse signal to a respective transducer. The transceiver further includes at least one downlink transmitter, which is adapted to receive an echo signal from the respective transducer, and is configured to extract envelope information from the echo signal and to transmit a modulated echo signal over a respective downlink wireless channel. The transceiver also includes a downlink receiver adapted to receive the modulated echo signals from the respective downlink transmitters.

38 Claims, 12 Drawing Sheets

WIRELESS TRANSCEIVER AND METHOD FOR REMOTE ULTRASONIC MEASUREMENTS

BACKGROUND OF INVENTION

The invention relates generally to remote ultrasonic measurements and, more particularly, to a wireless transceiver for remote ultrasonic measurements.

Ultrasonic probes are used to perform a variety of measurements including measuring the distance from a target. An exemplary conventional ultrasonic pulser/receiver 10 is illustrated in FIG. 1, in block form. A pulse generator 1 supplies a large amplitude, radio-frequency (RF) tone burst, typically on the order of 10–100 kHz upon receiving a start measurement request signal. The pulse can be amplified, as needed, by an amplifier 2. A transducer 3 is excited by the tone burst, emitting a sound wave that is reflected from a target (not shown). The transducer, emits an electronic echo signal in response to the reflected wave. The electronic echo signal can be amplified by an amplifier 4 and converted to a digital representation by converting circuitry 5 for processing by a computer (not shown).

In one application of interest, ultrasonic probes are used to measure material levels within storage silos, e.g. grain level. Briefly, the ultrasonic probe ascertains material level by measuring the echo time of flight of an ultrasonic pulse and the ambient temperature. The distance between the probe and the grain level can then be calculated using the echo time and the ambient temperature. The ultrasonic transceiver of FIG. 1 is conventionally employed for these ultrasonic level measurements.

A typical ultrasonic level sensing system 20 is illustrated in FIG. 2, in block form. The level sensing system includes a number of ultrasonic transducers 3 and a central processing unit (CPU) 6. The transducers are situated in separate silos and are connected to the CPU by cables 7. Because of the size of the silos, the cables are long, with lengths of up to 100 feet or more. The use of the long cables undesirably increases the time and labor costs of installation of the ultrasonic level sensing system. Accordingly, it would be desirable to eliminate the cables.

One possible solution would be to control each transducer individually, so as to eliminate the need for the CPU. However, given that the transducers are relatively inexpensive and processing units are quite expensive, such a solution would dramatically increase the cost of the ultrasonic level sensing system. Further, both simultaneous control of the transducers and central collection of the level measurements are desirable. Accordingly, the proposed solution would not alleviate the need for connections to a CPU.

Accordingly, it would be desirable to develop a wireless ultrasonic measurement system that provides wireless connections between a number of transducers and a remote control unit. In addition, it would be desirable to provide wireless connections between the transducers and a central data processor. Further, it would be desirable for the wireless connections to operate at frequencies in the Industrial, Scientific and Medical (ISM) band.

SUMMARY OF INVENTION

Briefly, in accordance with one embodiment of the present invention, a wireless transceiver for performing ultrasonic measurements includes an uplink transmitter configured to transmit at least one modulated timing pulse signal. Each modulated timing pulse signal is transmitted over a respective uplink wireless channel.

The wireless transceiver further includes at least one uplink receiver. Each uplink receiver is adapted to receive a respective one of the modulated timing pulse signals from the uplink transmitter and is configured to supply an unmodulated timing pulse signal to a respective transducer. The wireless transceiver also includes at least one downlink transmitter. Each downlink transmitter is adapted to receive an echo signal from the respective transducer, and is configured to extract envelope information from the echo signal and to transmit a modulated echo signal over a respective downlink wireless channel.

In addition, the wireless transceiver includes a downlink receiver, which is adapted to receive the modulated echo signals. Each modulated echo signal is received from the respective downlink transmitter.

A method for performing ultrasonic, wireless measurements, according to a third embodiment of the invention, includes transmitting at least one modulated timing pulse signal. Each modulated timing pulse signal is transmitted over a respective uplink wireless channel.

The method for performing ultrasonic, wireless measurements further includes receiving the modulated timing pulse signal over the uplink wireless channel and supplying a respective demodulated timing pulse signal to a respective transducer.

The method also includes receiving an echo signal from the respective transducer, extracting an envelope information signal from the echo signal, and transmitting a respective modulated echo signal over a respective downlink channel.

In addition, the method includes receiving the modulated echo signal and supplying a respective demodulated echo signal to a processing unit.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 3:
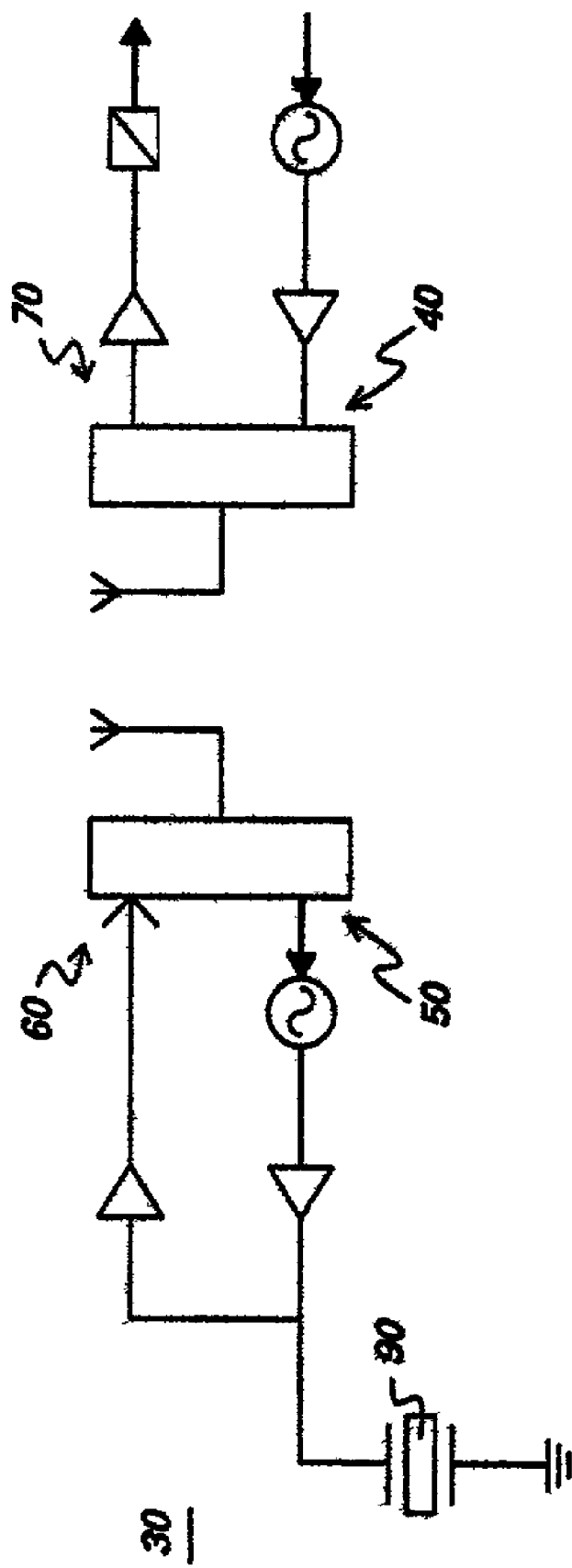
FIG. 3 depicts, in block form, a wireless transceiver according to a first embodiment of the present invention, the wireless transceiver including an uplink transmitter, an uplink receiver, a downlink transmitter, and a downlink receiver, where the wireless transceiver is illustrated for the case of a single transducer.

A wireless transceiver 30 according to a first embodiment of the present invention is illustrated for the case of a single transducer 90 in FIG. 3, in block form. The transceiver includes an uplink transmitter 40. Briefly, the uplink transmitter is adapted to receive a start signal from an external source (not shown). As used herein, the phrase "adapted to receive a signal" means that the component (here, the uplink transmitter) is equipped with a means for receiving the signal, such as an electrical connector, for example a wire or a cable, or a wireless means, such as an antenna. The uplink transmitter is configured to generate a logic level timing pulse signal, in response to the start signal, and to transmit a modulated timing pulse signal over one or more uplink wireless channels, with one uplink wireless channel provided for each transducer. As used herein, the phrase "configured to" means that the component (here, the uplink transmitter) includes circuit elements that manipulate an input signal to produce the stated output. These elements are explained in detail below with respect to FIG. 4. For the sake of clarity, the wireless transceiver will first be explained for the case of a single transducer and hence for transmission over one uplink wireless channel.

The wireless transceiver 30 further includes an uplink receiver 50. Briefly, the uplink receiver is adapted to receive the modulated timing pulse signal from the uplink transmitter. Further, the uplink receiver is configured to amplify a demodulated timing pulse signal and to supply an unmodulated timing pulse signal to a transducer 90. These features are described in detail below with respect to FIG. 6. As explained with respect to FIG. 1, the unmodulated timing pulse signal excites the transducer, causing the transducer to emit a pulse wave. The pulse wave is reflected off a target (not shown) causing the transducer to produce an echo signal.

The wireless transceiver 30 further includes a downlink transmitter 60, which is adapted to receive the echo signal from the transducer. Further, the downlink transmitter is configured to amplify the echo signal, to extract envelope information from the echo signal, and to transmit a modulated echo signal over a downlink wireless channel. These features are described in detail below with respect to FIG. 7.

The wireless transceiver 30 further includes a downlink receiver 70, which is adapted to receive the modulated echo signal from the downlink transmitter. Further, the downlink receiver is configured to amplify a demodulated echo signal and to supply an amplified demodulated echo signal to a processing unit, such as a computer. These features are described in detail below with respect to FIG. 8. According to one aspect, the processing unit is a central processing unit (CPU).

Figure 1:
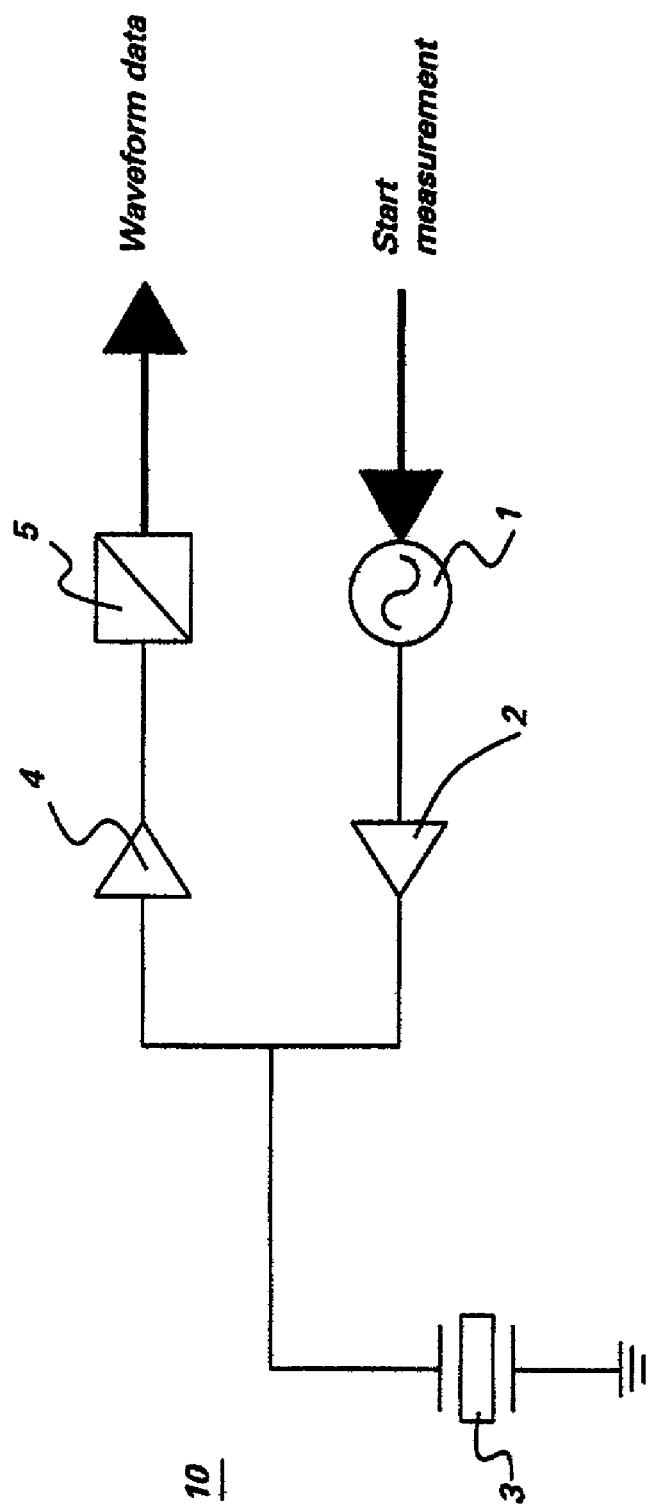
FIG. 1 schematically illustrates a conventional ultrasonic pulser/receiver arrangement.
Figure 2:
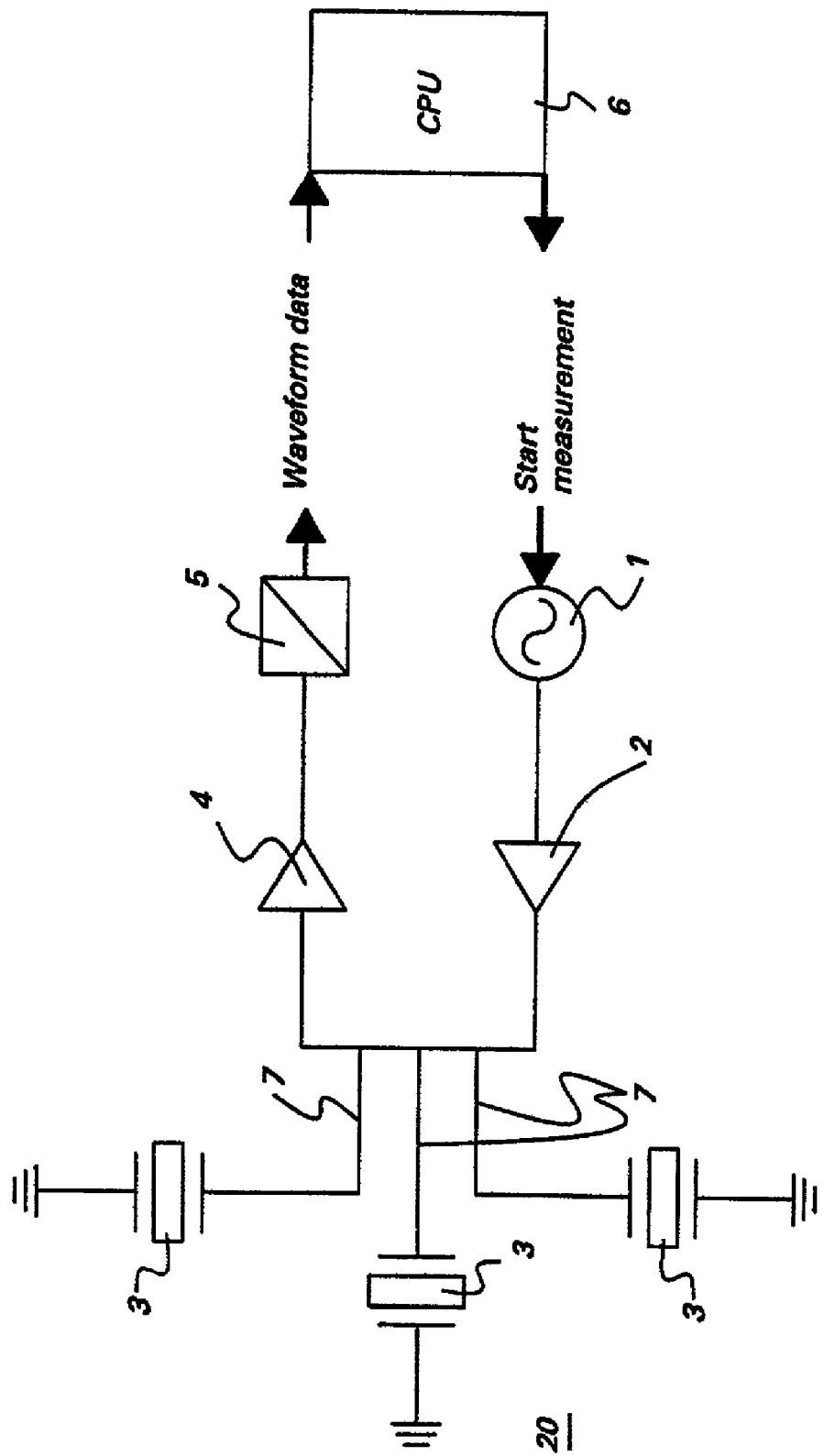
FIG. 2 illustrates a conventional level sensing system, in block form.

Advantageously, the wireless transceiver 30 of the first embodiment eliminates the use of cumbersome cables 7, as discussed above with respect to the conventional measurements systems depicted in FIGS. 1 and 2.

Figure 4:
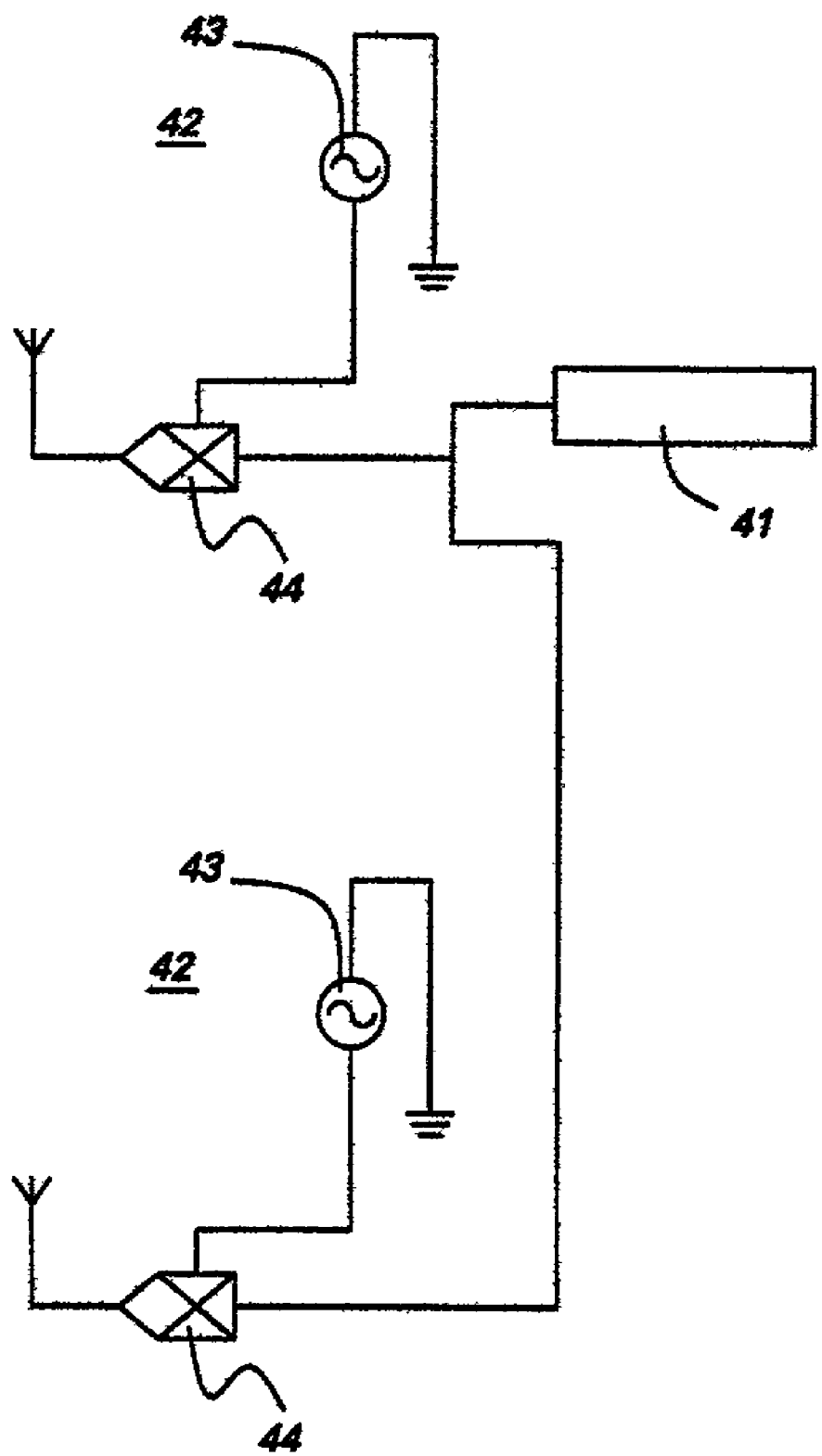
FIG. 4 schematically illustrates the uplink transmitter of the wireless transceiver of the first embodiment.

The uplink transmitter 40 of the first embodiment is illustrated in FIG. 4. The uplink transmitter includes a logic level timing pulse generator 41, which generates a logic level timing pulse signal in response to the start signal received by the uplink transmitter. The uplink transmitter further includes an uplink modulator 42 for modulating the logic level timing pulse signal, to supply a modulated timing pulse signal. According to one aspect, the logic level pulse generator supplies a plurality of clean timing pulses to the uplink modulator, to prevent accidentally triggering the transducer.

According to a second aspect, the uplink modulator 42 includes an uplink carrier signal source 43. According to a third aspect, the uplink carrier signal source outputs an uplink carrier signal in the Industrial, Scientific and Medical (ISM) band. Advantageously, the ISM Band provides radio propagation characteristics but does not require an FCC license. The ISM bands include: 902–928 MHz in North America, 433 MHz and 868 MHz in Europe, and 2–2.4 GHz in North America and Europe. (Hereinafter, these bands are collectively referred to as "the ISM band.") Advantageously, the 2–2.4 GHz range complies in both North America and Europe for license-free operation, as well as providing better propagation performance in industrial environments. On the other hand, the lower frequency bands (433 MHz, 868 MHz, and 915 MHz) are beneficial, in that they permit use of less expensive transceiver components than those currently available at 2 GHz.

According to a fourth aspect, the uplink modulator 42 includes a first uplink mixer 44 for mixing the uplink carrier signal and the timing pulses. The uplink modulator 42 may take many well known forms, suitable for modulating the logic level pulses, including AM, FM, frequency shift keying (FSK), continuous phase shift keying (CPSK), and amplitude shift keying (ASK) modulation. Such modulators are well known to those skilled in the art and will not be described in detail here.

Figure 5:
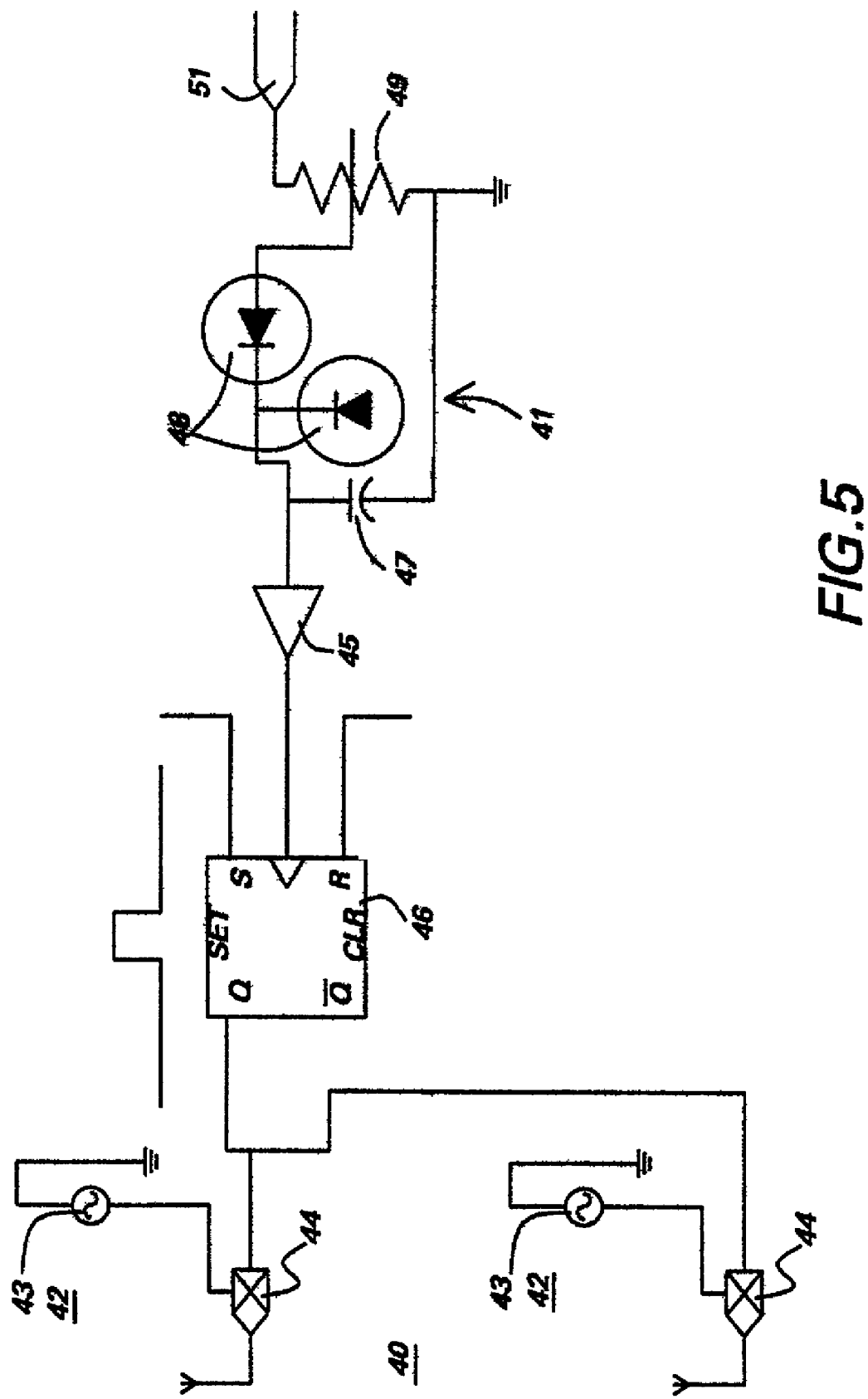
FIG. 5 illustrates an uplink transmitter according to another aspect.

According to a fifth aspect, the logic level timing pulse (LLTP) generator 41 is configured to convert a tone burst input signal to a logic level timing pulse. This is advantageous in that it facilitates the incorporation of the transceiver 20 into existing level measurement systems. The LLTP generator, according to this fifth aspect, includes an uplink limiter 48 for rectifying an input signal to supply a rectified signal. The uplink limiter is exemplarily shown as a diode clipping circuit (also indicated by reference number 48) in FIG. 5. The LLTP generator further includes a filter 47. According to a sixth aspect, the filter is a low pass filter for removing high frequency noise from the rectified signal to supply a smooth signal, in order to prevent accidentally triggering the transducer 90. Exemplary filters include capacitors, and a polarized capacitor (also indicated by reference number 47) as shown in FIG. 5. The LLTP generator further includes a buffer and amplification unit 45 for conditioning the smooth signal to a logic level pulse signal. According to a seventh aspect, the buffer and amplification unit includes a comparator, as shown in FIG. 5. The comparator is a circuit device that is configured to compare two input levels (Vin—Vref) and to set its voltage output to either a maximum or a minimum as a function of the mathematical sign of the subtraction (that is Vin>Vref or Vin<Vref). In this manner, the comparator controls the level at which the logic level pulse signal is generated. Moreover, the comparator can include different circuit devices, such as operational amplifiers.

The LLTP generator further includes a synchronizing unit 46 for aligning the logic level pulse signal with a clock (not shown) in order to control an on-off cycle of the logic level pulse to supply a timing pulse signal. According to one aspect, the synchronizing unit includes a bistable logic device, e.g. a flip-flop (indicated by the same reference number 46), as illustrated in FIG. 5.

According to an eighth aspect, the uplink transmitter 40 further includes a pulse signal generator 51 for supplying the input signal, as illustrated in FIG. 5. Alternatively, the input signals can be supplied by an external source (not shown). According to a ninth aspect, the pulse signal generator is a high voltage pulse signal generator, such as a pulser amplifier. Where the input signal has a large amplitude, the LLTP uplink transmitter according to a tenth aspect includes an attenuator 49, as illustrated in FIG. 5. The attenuator is configured to reduce the amplitude of the input signal in order to protect circuit elements in the LLTP generator. One exemplary attenuator is a voltage divider with an exemplary voltage attenuation of about 100:1.

Figure 6:
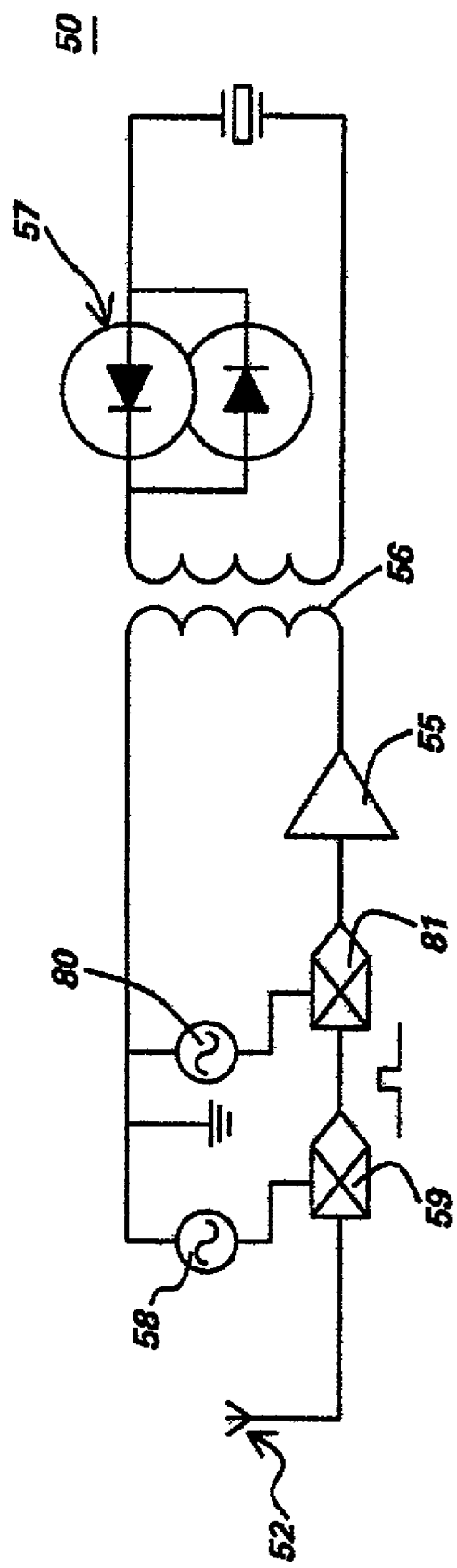
FIG. 6 schematically illustrates the uplink receiver of the wireless transceiver of the first embodiment for the case of a single transducer.

The uplink receiver 50 of the first embodiment is illustrated in FIG. 6. The uplink receiver includes a timing pulse signal receiver, for example an antenna, which is indicated schematically by reference numeral 52 in FIG. 6. The uplink receiver further includes an uplink demodulator 53, which may take many well known forms suitable for demodulating a signal received from the uplink transmitter 40. An exemplary demodulator is shown in FIG. 6 and includes an uplink signal generator 58 for generating an uplink demodulating signal and a second uplink mixer 59 for mixing the uplink demodulating signal with the uplink carrier signal to supply the demodulated timing pulse signal. According to one aspect, the first demodulating signal has a frequency of the uplink carrier signal.

The uplink receiver 50 further includes a tone burst generator 54 for converting the demodulated timing pulse signal to a drive tone signal capable of exciting the transducer 90. Typical transducers are excited by RF tone bursts, with frequencies in the range of about 10 kHz to about 100 kHz. According to a second aspect, the tone burst generator is configured to operate in this frequency range and is adjusted to efficiently excite the type of transducer being employed. According to a third aspect, the tone burst generator is also adjusted to operate in a frequency range desirable for the type of measurement being performed. For example, if the target (not shown) is a short distance away from the transducer, a higher frequency should be used than where the target is a long distance from the transducer.

According to a fourth aspect, the tone burst generator includes a tone burst signal generator 80, which is configured to supply a tone burst signal. According to a fifth aspect, the tone burst signal generator is configured to operate in the RF range (about 10 kHz to about 100 kHz). The tone burst generator further includes a gate 81 for synchronizing the tone burst signal on the demodulated timing pulse signal. Exemplary gates include a multiplier cell or a high speed CMOS switch.

According to a sixth aspect, the uplink receiver 50 further includes a tone burst amplification unit 55, which is configured to amplify the drive tone signal to supply an amplified drive tone signal. An exemplary tone burst amplification unit 55 includes an amplifier, which is configured to produce an amplified drive tone signal in the range of about 100 V to about 300 V, with an exemplary amplified signal having an amplitude of about 300 V. As with the desired tone burst generator frequency, the preferred amplified drive tone signal amplitude depends on the type of transducer 90 being employed, as well as on the type of measurement being performed. For example, larger amplification is desirable for a target positioned far from the transducer 90 than where the target is close to the transducer.

According to a seventh aspect, the uplink receiver 50 further includes a step-up transformer 56, which is configured to step up the signal to supply a stepped up drive signal, in a range of about 100V to about 300 V, to the transducer 90. An exemplary step-up ratio is about 10 to 1. The stepped up drive signal excites the transducer 90, which ultimately produces the echo signal.

According to an eighth aspect, the uplink receiver 50 further includes a diplexer 57, which is configured to turn the tone burst amplification unit 55 on and off, in order to prevent the tone burst amplification unit from loading down the transducer. One exemplary diplexer is a series diode pair, as illustrated in FIG. 6. Alternatively, a switch could be employed to control the tone burst amplification unit.

Figure 7:
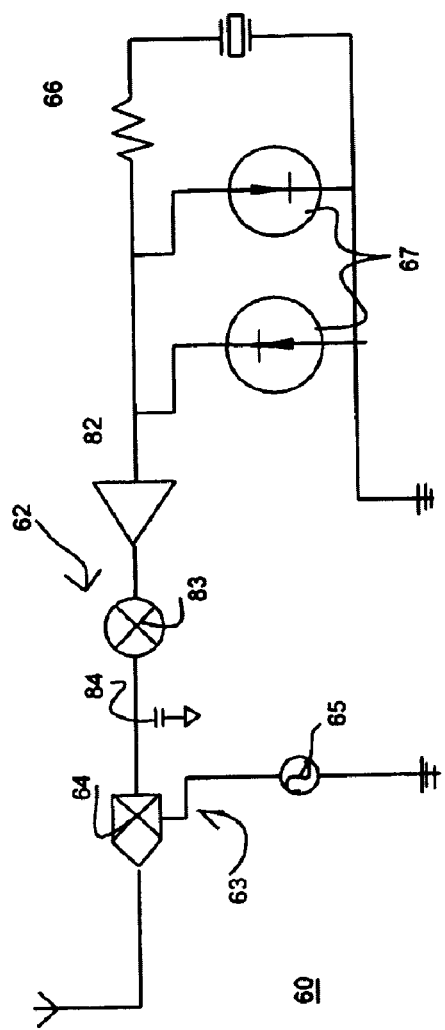
FIG. 7 schematically illustrates the downlink transmitter of the wireless transceiver of the first embodiment for the case of a single transducer.

The downlink transmitter 60 of the first embodiment is illustrated in FIG. 7. The downlink transmitter includes a downlink limiter 61, which is configured to supply a limited echo signal, protecting an envelope information extractor 62 from being damaged by the tone burst signal or by a very large echo signal. An exemplary downlink limiter is shown in FIG. 7 and includes a resistive element 66, such as a resistor, and a pair of diodes 67 connected back-to-back.

The downlink transmitter 60 further includes an envelope information extractor 62, which is configured to extract envelope information from the limited echo signal to supply an envelope information signal. According to one aspect, the envelope information extractor includes an echo amplifier 82, which is configured to amplify the limited echo signal, as illustrated in FIG. 7. Typical echo signal amplitudes are on the order of μV whereas signal amplitudes on the order of about 100 mV are often required for extraction of amplitude because of limitations inherent to envelope extraction. Accordingly, one exemplary amplification is on the order of 10,000 times. The exemplary envelope information extractor 62 shown in FIG. 7 further includes an echo mixer 83 for signal and reference multiplication and an echo capacitor 84 for low pass filtering. Briefly, envelope extraction is performed by a multiplication, or homodyne, process. The limited echo signal is multiplied by a constant envelope signal of the same carrier frequency, fc, (e.g. about 20 kHz) using echo mixer 83. The multiplication process is a non-linear process, which produces an output signal with a differential frequency component (fc–fc) and an additive frequency component (fc+fc). The echo capacitor 84 is used to reject the additive frequency component (fc+fc). The resulting differential frequency component (fc–fc) contains the envelope information.

The downlink transmitter 60 further includes a downlink modulator 63, which is configured to modulate the envelope information signal. According to a second aspect, the downlink modulator is configured to use frequency modulation and includes a downlink carrier signal source 65 and a first downlink mixer 64. The downlink carrier signal source is configured to supply a downlink carrier signal. The first downlink mixer is configured to mix the downlink carrier signal with the envelope information signal to produce a modulated echo signal. According to a third aspect, the downlink carrier signal source operates in the ISM band, for example producing an approximately 900 MHz downlink carrier signal frequency.

Figure 8:
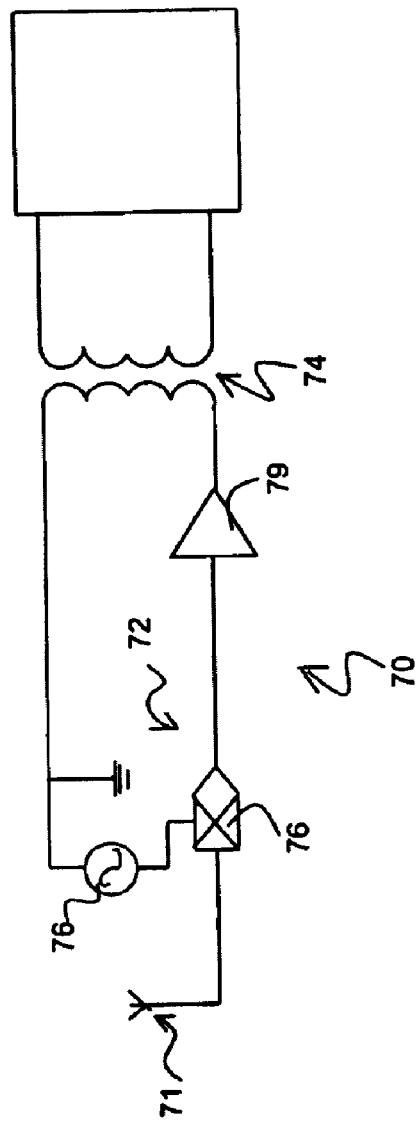
FIG. 8 schematically illustrates the downlink receiver of the wireless transceiver of the first embodiment for the case of a single transducer.

The downlink receiver 70 of the first embodiment is illustrated in FIG. 8. The downlink receiver includes an echo signal receiver, which is adapted to receive the modulated echo signal, for example an antenna, which is indicated schematically by reference numeral 71 in FIG. 8. The downlink receiver further includes a downlink demodulator 72, which may take many well known forms suitable for demodulating the modulated echo signal to supply a demodulated echo signal. An exemplary downlink demodulator is shown in FIG. 8 and includes a downlink signal generator 75 and a second downlink mixer 76. According to one aspect, the downlink signal generator is configured to generate a downlink demodulating signal at the downlink carrier signal frequency.

According to a second aspect, the downlink receiver 70 further includes an end amplification unit 73, which is configured to amplify the demodulated echo signal by, for example about 10 to about 100 times, to supply an amplified demodulated echo signal. According to a third aspect, the downlink receiver includes an isolation coupler 74, which is configured to relay the amplified demodulated echo signal to the processing unit, such as a CPU. One exemplary isolation coupler is a transformer, as shown in FIG. 8. An exemplary transformer is a 1-1 transformer. Alternatively, the downlink receiver can supply the amplified echo signal to the CPU directly, by means of a wire or the like.

Next, the wireless transceiver of the first embodiment will be explained for the case of multiple transducers, with reference to FIGS. 4, 10, and 11. Only those aspects of the wireless transceiver pertaining to the multiple transducer compatibility will be discussed because the other aspects of the transceiver are as discussed above for the single transducer case.

Briefly, the wireless transceiver 30 generalized for the case of multiple transducers includes an uplink transmitter 40 for transmitting a set of modulated timing pulse signals over a set of wireless channels. The uplink transmitter is exemplarily illustrated in FIG. 4 and was described above for the case of a single transducer 90. As illustrated in FIG. 4, the uplink transmitter includes a set of uplink modulators 42 for modulating the timing pulse signal to produce the set of modulated timing pulse signals. According to one aspect, one uplink modulator is provided for each transducer.

Figure 10:
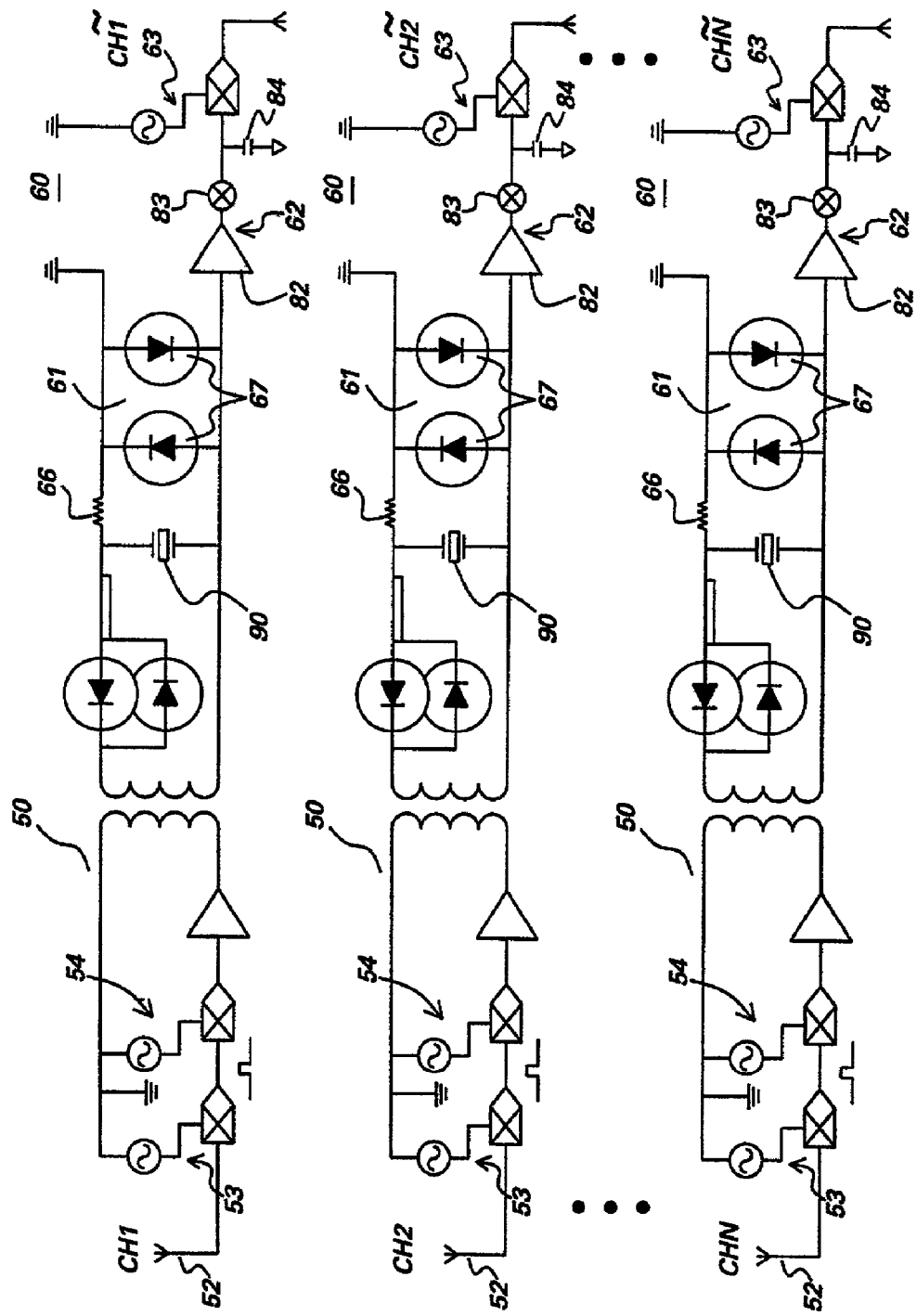
FIG. 10 schematically illustrates a plurality of uplink receivers and downlink transmitters of the wireless transceiver of the first embodiment for the case of multiple transducers.

As exemplarily illustrated in FIG. 10, the wireless transceiver 30 generalized for the case of multiple transducers further includes a set of uplink receivers 50, with one uplink receiver being preferably provided for each transducer 90. According to one aspect, each uplink receiver (for example the "jth" uplink receiver) includes a jth timing pulse signal receiver 52, which is adapted to receive a jth modulated timing pulse signal from the uplink transmitter 40 over the jth uplink wireless channel. The jth uplink receiver 50 further includes a jth uplink demodulator 53, which is configured to demodulate the jth modulated timing pulse signal and to produce a jth demodulated timing pulse signal. The jth uplink receiver also includes a jth tone burst generator 54, which is configured to convert the jth demodulated timing pulse signal to a jth drive tone signal for driving the jth transducer 90.

The wireless transceiver 30 generalized for the case of multiple ("N") transducers includes a set of downlink transmitters 60, as exemplarily illustrated in FIG. 10, with one downlink transmitter being preferably provided for each of the N transducers 90. According to one aspect, each downlink transmitter (for example the "jth" downlink transmitter) includes a jth downlink limiter 61, which is configured to protect a jth envelope information extractor 62 and to supply a jth limited echo signal. (As used herein, "j" represents an integer between 1 and N, where N is the number of transducers.) The jth downlink transmitter further includes the jth envelope information extractor 62, which is configured to extract the envelope information from the limited echo signal and to supply a jth envelope information signal. The jth downlink transmitter also includes a jth downlink modulator 63 for modulating the envelope information signal to supply a jth modulated echo signal. The jth downlink transmitter is further configured to transmit the jth modulated echo signal over a jth downlink wireless channel.

Figure 11:
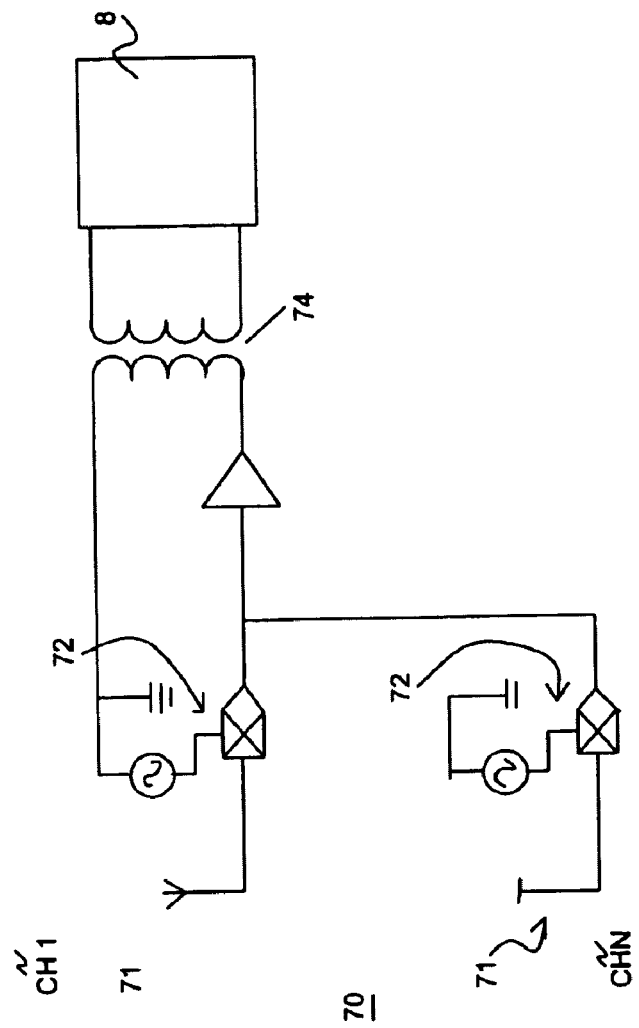
FIG. 11 schematically illustrates the downlink receiver of the wireless transceiver of the first embodiment for the case of multiple transducers.

The wireless transceiver 30 generalized to the case of multiple transducers further includes a downlink receiver 70, as exemplarily illustrated in FIG. 11. According to one aspect, the downlink receiver includes a set of echo signal receivers 71, as illustrated in FIG. 11. According to this first aspect, each echo signal receiver (for example the "jth" echo signal receiver) is adapted to receive the jth modulated echo signal from the respective jth downlink transmitter 60 over the respective jth downlink wireless channel. One exemplary echo signal receiver is an antenna. According to this first aspect, the down link receiver further includes a set of downlink demodulators 72. Each downlink demodulator (for example the "jth" down link demodulator) is configured to demodulate the jth modulated echo signal to supply a jth demodulated echo signal. The downlink receiver is further configured to supply the demodulated echo signals to a processing unit 6, for example via a transformer 74 (as shown in FIG. 11) or via a wire (not shown) or the like.

Figure 12:
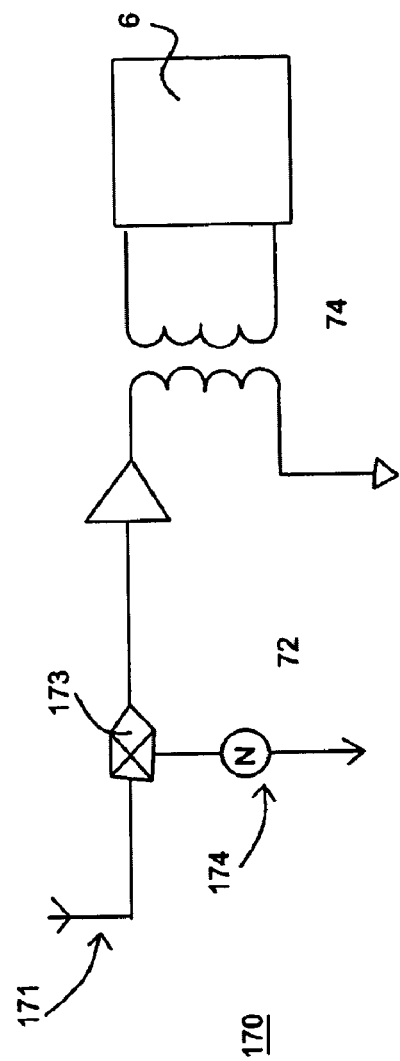
FIG. 12 schematically illustrates a single antenna alternative to the downlink receiver of FIG. 11.

According to a second aspect, a downlink receiver 170 includes an echo signal receiver 171, as illustrated in FIG. 12. According to this second aspect, the echo signal receiver is adapted to receive the modulated echo signals from the downlink transmitters 60 over the downlink wireless channels. An exemplary echo signal received is an antenna, which is also indicated by the reference numeral 171 in FIG. 12. The downlink receiver 171 further includes a tunable downlink demodulator 174 for demodulating the modulated echo signals to supply a plurality of demodulated echo signals to a processing unit 6, for example via a transformer 74 (as shown in FIG. 11) or via a wire (not shown) or the like. An exemplary tunable downlink receiver is illustrated in FIG. 12 and includes a tunable oscillator 172 and a mixer 173. The tunable oscillator is configured to select a downlink wireless channel 1-N, to supply a respective downlink carrier signal. The mixer is configured to mix each of the downlink carrier signals with the respective modulated echo signal to supply a set of demodulated echo signals.

As with the single transducer case, according to one aspect, the uplink modulators 42 and the uplink demodulators 53, illustrated in FIGS. 4 and 10, are configured to perform one of AM, FM, FSK, and CPSK modulation and demodulation, respectively. According to this aspect, the downlink modulators 63, illustrated in FIG. 10, and the downlink demodulators 72, shown in FIG. 11, are configured to perform one of AM, FM, FSK, and CPSK modulation and demodulation, respectively.

According to a second aspect, each uplink modulator (for example the "jth" uplink modulator 42) includes a jth uplink carrier signal source 43, which is configured to supply a jth uplink carrier signal, as illustrated in FIG. 5. The jth uplink modulator further includes a jth first uplink mixer 44 for mixing the jth uplink carrier signal and the timing pulse signal to supply the jth modulated timing pulse signal.

According to this aspect, a jth uplink demodulator 53 includes a jth uplink signal generator 58 for supplying an uplink demodulating signal and a jth second uplink mixer 59 for mixing the uplink demodulating signal and the jth modulated timing pulse signal to supply the jth demodulated timing pulse signal.

According to a third aspect, the downlink receiver 70 includes a set of downlink demodulators 72, as shown in FIG. 11. A jth downlink demodulator 72 is configured to demodulate a jth modulated echo signal. According to this aspect, a jth downlink modulator 63 includes a jth downlink carrier signal source 65, for supplying a downlink carrier signal, and a jth first downlink mixer 64 for mixing the downlink carrier signal and the jth envelope information signal to supply a jth modulated echo signal. According to this aspect, the jth downlink demodulator includes a downlink signal generator 75, for supplying a downlink demodulating signal, and a second downlink mixer 76 for mixing the downlink demodulating signal and the jth modulated echo signal to supply the jth demodulated echo signal.

According to a fourth aspect, the uplink carrier signal and the uplink demodulating signal have an uplink frequency in the ISM band, and the downlink carrier signal and the downlink demodulating signal have a downlink frequency in the ISM band.

Figure 9:
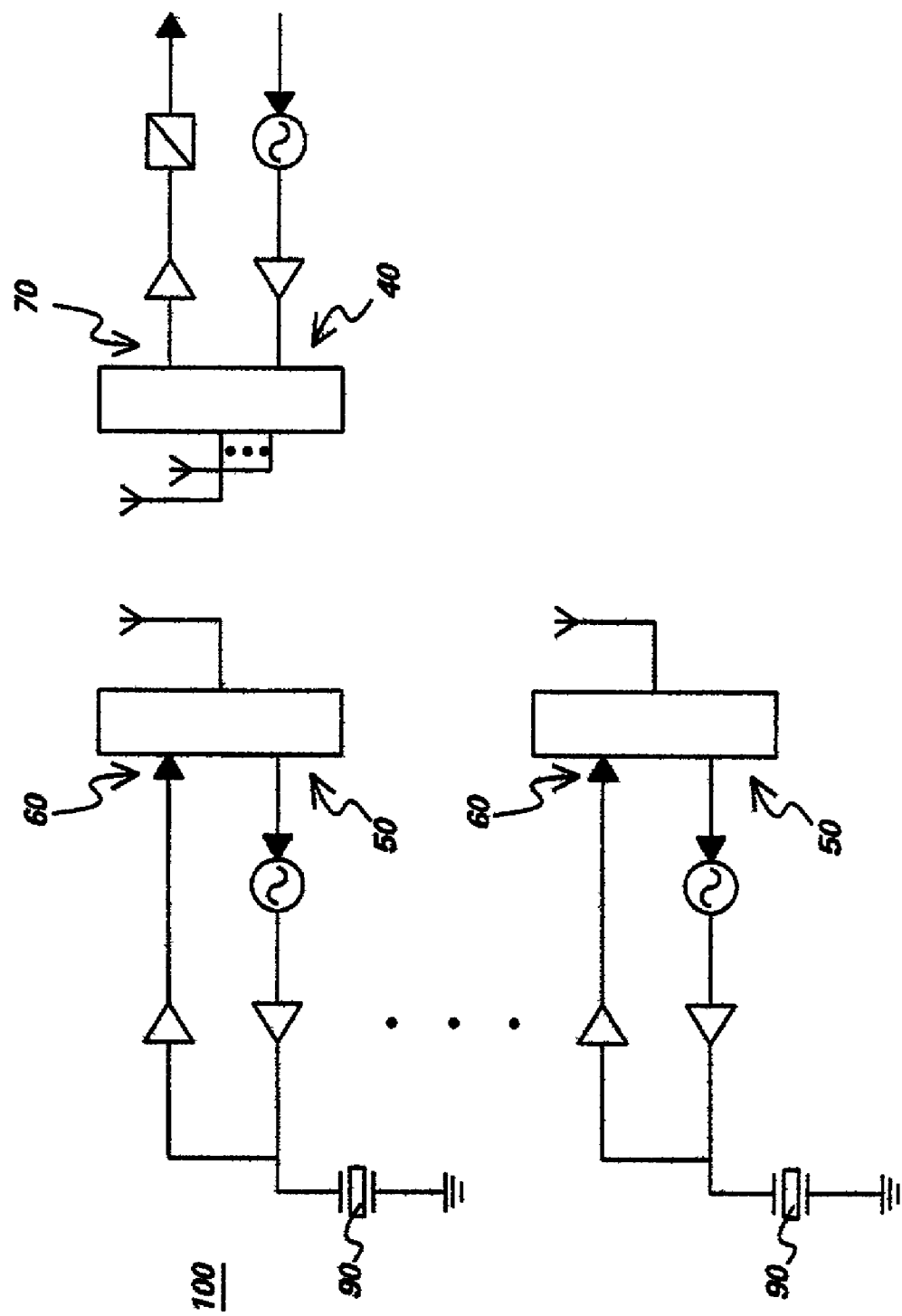
FIG. 9 illustrates, in block form, a wireless ultrasonic measurement system according to a second embodiment of the present invention, the measurement system including a plurality of transducers and the wireless transceiver of the first embodiment implemented for the case of multiple transducers.

A wireless ultrasonic measurement system 100 according to a second embodiment of the present invention is schematically illustrated in FIG. 9. The measurement system incorporates the wireless transceiver 30 of the first embodiment, generalized for the case of multiple transducers, for performing ultrasonic measurement using a plurality of transducers 90. Accordingly, descriptions of features of the wireless transceiver 30 presented above will not be repeated.

As illustrated in FIG. 9, the wireless ultrasonic measurement system 100 includes the uplink transmitter 40 for transmitting a set of modulated timing pulse signals over a set of wireless channels. The uplink transmitter 40 is exemplarily illustrated in FIG. 4 and is discussed above. The measurement system further includes a set of uplink receivers 50, which are exemplarily illustrated in FIG. 10, with a jth receiver being adapted to receive a jth modulated timing pulse signal over a jth uplink wireless channel.

The wireless ultrasonic measurement system 100 further includes a plurality of transducers 90, as exemplarily illustrated in FIGS. 9 and 10. Each transducer is excited by a demodulated timing pulse signal supplied by a respective one of the uplink receivers. In response, the transducer emits an echo signal.

The wireless ultrasonic measurement system 100 also includes a set of downlink transmitters 60, with one downlink transmitter being provided for one uplink receiver, as exemplarily illustrated in FIG. 10. Each downlink transmitter 60 is adapted to receive an echo signal from a respective transducer 90 and is configured to transmit a respective modulated echo signal.

According to one aspect, the wireless ultrasonic measurement system 100 further includes the downlink receiver 70 for receiving a set of modulated echo signals from the downlink transmitters, as illustrated in FIG. 9. The downlink receiver is adapted to receive a jth modulated echo signal from the jth downlink transmitter over a jth downlink wireless channel. According to a second aspect, the wireless ultrasonic measurement system 100 further includes the downlink receiver 170, shown in FIG. 12, for receiving the set of modulated echo signals from the downlink transmitters.

Thus, the wireless ultrasonic measurement system 100 of the second embodiment can be understood as a measurement system employing the wireless transceiver 30 of the first embodiment generalized for the case of a set of transducers 90, such that a separate wireless channel, uplink receiver, and downlink transmitter are provided for each transducer. Accordingly, detailed descriptions of the transceiver components are presented above and will not be repeated here.

A third embodiment of the present invention provides a method of performing remote, ultrasonic wireless measurements. The method includes transmitting a modulated timing pulse signal over at least one uplink wireless channel. According to one aspect, the timing pulse signal is modulated with a carrier signal in the ISM band, for example with an approximately 900 MHz uplink carrier signal. According to a second aspect, the method further includes generating a timing pulse signal and modulating the timing pulse signal to produce the modulated timing pulse signal.

The method further includes receiving the modulated timing pulse signal over the uplink wireless channel and supplying a respective demodulating timing pulse signal to a respective transducer 90. According to a third aspect, the method further includes demodulating the modulated timing pulse signal to produce the demodulated timing pulse signal. According to a fourth aspect, the method also includes converting the demodulated timing pulse signal to a drive tone signal by generating a tone burst signal and gating the tone burst signal on the demodulated timing pulse signal to supply the drive tone signal to the transducer. According to a fifth aspect, the method includes amplifying the drive tone signal to supply an amplified drive tone signal to the transducer. According a sixth aspect, the method further includes stepping up the amplified drive tone signal to supply a stepped up drive signal to the transducer. According to a seventh aspect, the modulated timing pulse signal is demodulated with an uplink demodulation signal in the ISM band, for example with an approximately 900 MHz uplink demodulation signal.

The method further includes receiving an echo signal from the transducer 90, extracting envelope information from the echo signal to supply an envelope signal, and transmitting a respective modulated echo signal over a respective downlink wireless channel. According to an eighth aspect, the method further includes modulating the envelope signal to supply a modulated echo signal. According to a ninth aspect, the extracting step includes amplifying the echo signal. According to a tenth aspect, the envelope signal is modulated with a downlink carrier signal in the ISM band, for example with an approximately 900 MHz downlink carrier signal.

In addition, the method includes receiving the modulated echo signal and supplying a respective demodulated echo signal to a processing unit 6. According to an eleventh aspect, the method further includes demodulating the modulated echo signal to supply the respective demodulated echo signal. According to a twelfth aspect, the method further includes amplifying the demodulated echo signal. According to a thirteenth aspect, the modulated echo signal is demodulated using a downlink demodulation signal in the ISM band, for example with an approximately 900 MHz downlink demodulation signal.

According to a fourteenth aspect, the two modulating steps and the two demodulating steps employ one of AM, FM, FSK, and CPSK modulation and demodulation, respectively.

According to a fifteenth aspect, the timing pulse signal is modulated to produce a plurality of modulated timing pulse signals. The modulated timing pulse signals are transmitted over a plurality of uplink wireless channels, by transmitting one modulated timing pulse signal over one uplink wireless channel.

According to this aspect, the method includes receiving the modulated timing pulse signals, demodulating the modulated timing pulse signals to produce a plurality of demodulated timing pulse signals, and supplying the demodulated timing pulse signals to a plurality of transducers 90, with each demodulated timing pulse signal being supplied to a respective one of the transducers.

According to this aspect, the method further includes receiving a plurality of echo signals from the transducers 90, extracting envelope information from each echo signal to supply a plurality of envelope signals, modulating each of the envelope signals to supply a plurality of modulated echo signals, and transmitting the modulated echo signals over a plurality of downlink wireless channels.

According to this aspect, the method also includes receiving and demodulating the modulated echo signals to supply a plurality of demodulated echo signals to a processing unit 6.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A wireless transceiver for performing ultrasonic measurements, said wireless transceiver comprising:
    an uplink transmitter configured to transmit at least one modulated timing pulse signal, each modulated timing pulse signal being transmitted over a respective uplink wireless channel, wherein the modulated timing pulse signal comprises a timing pulse signal modulated using an uplink carrier signal;
    at least one uplink receiver, each uplink receiver being adapted to receive a respective one of the modulated timing pulse signals from said uplink transmitter and being configured to supply an unmodulated timing pulse signal to a respective transducer;
    at least one downlink transmitter, each downlink transmitter being adapted to receive an echo signal from the respective transducer, and being configured to extract envelope information from the echo signal and to transmit a modulated echo signal over a respective downlink wireless channel, wherein the modulated echo signal is modulated using a downlink carrier signal; and
    a downlink receiver adapted to receive the modulated echo signals, each modulated echo signal being received from said respective downlink transmitter.

2. The wireless transceiver of claim 1, wherein said uplink transmitter includes:
    a logic level timing pulse ("LLTP") generator configured to generate timing pulse signal, and
    at least one uplink modulator, each uplink modulator being configured to modulate the timing pulse signal using the uplink carrier signal to produce the respective modulated timing pulse signal.

3. The wireless transceiver of claim 2, wherein said LLTP generator includes:
    an uplink limiter configured to rectify an input signal to produce a rectified signal;
    a filter configured to smooth the rectified signal to produce a smooth signal; and
    a buffer and amplification unit configured to condition the smooth signal to produce a logic level pulse signal.

4. The wireless transceiver of claim 3, wherein:
    said uplink limiter includes a diode clipping circuit, and
    said filter is a low pass filter and includes a capacitor.

5. The wireless transceiver of claim 4, wherein said buffer and amplification unit includes a comparator.

6. The wireless transceiver of claim 3, wherein said LLTP generator further includes a synchronizing unit configured to control an on-off cycle of the logic level pulse signal to supply the timing pulse signal.

7. The wireless transceiver of claim 6, wherein said synchronizing unit includes a bistable logic device.

8. The wireless transceiver of claim 6, wherein said uplink transmitter further includes a pulse signal generator for supplying the input signal.

9. The wireless transceiver of claim 8, wherein said pulse signal generator includes a pulser amplifier, and wherein said uplink transmitter further includes an attenuator configured to reduce an amplitude of the input signal.

10. The wireless transceiver of claim 2, wherein each uplink receiver includes:
    a timing pulse signal receiver adapted to receive the respective modulated timing pulse signal from said uplink transmitter over the respective uplink wireless channel;
    an uplink demodulator configured to demodulate the respective modulated timing pulse signal to produce a demodulated timing pulse signal; and
    a tone burst generator configured to convert the demodulated timing pulse signal to a drive tone signal.

11. The wireless transceiver of claim 10, wherein:
    said timing pulse signal receiver includes an antenna; and
    said tone burst generator includes:
        a tone burst signal generator for supplying a tone burst signal, and
        a gate for syncronizing the tone burst signal on the demodulated timing pulse signal.

12. The wireless transceiver of claim 11, wherein the tone burst signal has a frequency in a range of 10 kHz to 100 kHz.

13. The wireless transceiver of claim 10, wherein each uplink receiver further includes a tone burst amplification unit configured to amplify the drive tone signal to supply an amplified drive tone signal.

14. The wireless transceiver of claim 13, wherein each uplink receiver further includes a step-up transformer configured to step up the amplified drive tone signal to supply a stepped up drive signal to the respective transducer.

15. The wireless transceiver of claim 13, wherein each uplink receiver further includes a diplexer configured to turn said tone burst amplification unit on and off.

16. The wireless transceiver of claim 15, wherein said diplexer includes a series diode pair.

17. The wireless transceiver of claim 10, wherein each downlink transmitter includes:
    a downlink limiter configured to limit an echo signal produced by the respective transducer to supply a limited echo signal;
    an envelope information extractor configured to extract the envelope information from the limited echo signal to supply an envelope information signal; and
    a downlink modulator configured to modulate the envelope information signal using the downlink carrier signal to supply the respective modulated echo signal.

18. The wireless transceiver of claim 17, wherein said envelope information extractor includes:

an echo amplifier configured to amplify the limited echo signal to supply an amplified echo signal, an echo mixer configured to mix the amplified echo signal with an envelope signal to supply a mixed echo signal, and an echo capacitor configured to filter the mixed echo signal to supply the envelope information signal.

19. The wireless transceiver of claim 18, wherein said downlink limiter includes a resistive element and a pair of back-to-back connected diodes.

20. The wireless transceiver of claim 17, wherein said downlink receiver includes:
at least one echo signal receiver, each echo signal receiver being adapted to receive the respective modulated echo signal from said respective downlink transmitter over the respective downlink wireless channel;
at least one downlink demodulator, each downlink demodulator being configured to demodulate the respective modulated echo signal to supply a respective demodulated echo signal,
wherein said downlink receiver is adapted to supply the demodulated echo signals to a processing unit.

21. The wireless transceiver of claim 20, wherein said downlink receiver further includes:
an end amplification unit configured to amplify each respective demodulated echo signal to supply a respective amplified demodulated echo signal,
wherein said downlink receiver is adapted to supply the amplified demodulated echo signals to the processing unit.

22. The wireless transceiver of claim 21, wherein said downlink receiver further includes:
an isolation coupler for relaying the amplified demodulated echo signals to the processing unit.

23. The wireless transceiver of claim 22, wherein said isolation coupler includes a 1-1 transformer.

24. The wireless transceiver of claim 20, wherein each echo signal receiver includes an antenna.

25. The wireless transceiver of claim 20, wherein:
each uplink modulator and each respective downlink modulator are configured to employ one of AM, FM, FSK, and CPSK modulation, and
each uplink demodulator and each respective downlink demodulator are configured to employ one of AM, FM, FSK, and CPSK demodulation.

26. The wireless transceiver of claim 25, wherein:
each uplink modulator includes:
an uplink carrier signal source for supplying the uplink carrier signal, and
a first uplink mixer configured to mix the uplink carrier signal and the timing pulse signal to supply the respective modulated timing pulse signal, and
each respective uplink demodulator includes:
an uplink signal generator for supplying an uplink demodulating signal, and
a second uplink mixer configured to mix the uplink demodulating signal and the respective modulated timing pulse signal to supply the respective demodulated timing pulse signal.

27. The wireless transceiver of claim 26, wherein the uplink carrier signal and the first demodulating signal have an uplink frequency in the ISM band.

28. The wireless transceiver of claim 26, wherein:
each downlink modulator includes:
a downlink carrier signal source for supplying the downlink carrier signal, and a first downlink mixer configured to mix the downlink carrier signal and the respective envelope information signal to supply the respective modulated echo signal,
each respective downlink demodulator includes:
a downlink signal generator for supplying a downlink demodulating signal, and
a second downlink mixer configured to mix the downlink demodulating signal and the respective modulated echo signal to supply the respective demodulated echo signal.

29. The wireless transceiver of claim 28, wherein:
the uplink carrier signal and the uplink demodulating signal have an uplink frequency in the ISM band, and
the downlink carrier signal and the downlink demodulating signal have a downlink frequency in the ISM band.

30. The wireless transceiver of claim 17, wherein said downlink receiver includes:
an echo signal receiver adapted to receive the modulated echo signals from said downlink transmitters over the downlink wireless channels;
a tunable downlink demodulator configured to demodulate the modulated echo signals to supply a plurality of demodulated echo signals,
wherein said downlink receiver is adapted to supply the demodulated echo signals to a processing unit.

31. The wireless transceiver of claim 30, wherein said tunable downlink demodulator includes:
a tunable oscillator configured to supply a plurality of downlink carrier signals; and
a mixer configured to mix each of the modulated echo signals with a respective one of the downlink carrier signals to supply a plurality of demodulated echo signals.

32. The wireless transceiver of claim 31, wherein the downlink carrier signals are in the ISM band.

33. The wireless transceiver of claim 31, wherein said downlink receiver further includes:
an end amplification unit configured to amplify the demodulated echo signals to supply a plurality of amplified demodulated echo signals,
wherein said downlink receiver is adapted to supply the amplified demodulated echo signals to the processing unit.

34. The wireless transceiver of claim 31, wherein said echo signal receiver includes an antenna.

35. A wireless ultrasonic measurement system comprising:
a plurality of transducers for supplying a plurality of echo signals;
an uplink transmitter configured to transmit a plurality of modulated timing pulse signals over a plurality of uplink wireless channels, one uplink wireless channel being provided for each transducer, and each modulated timing pulse signal being transmitted over a respective one of the uplink wireless channels, wherein each of the modulated timing pulse signals comprises a respective timing pulse signal modulated using an uplink carrier signal;
a plurality of uplink receivers, each uplink receiver being adapted to receive a respective one of the modulated timing pulse signals from said uplink transmitter and being configured to supply a respective unmodulated timing pulse signal to a respective one of said transducers;
a plurality of downlink transmitters, each downlink transmitter being adapted to receive an echo signal from a respective one of said transducers and being configured to extract envelope information from the echo signal, and to transmit a respective modulated echo signal over a respective downlink wireless channel, wherein each of the modulated echo signals is modulated using a downlink carrier signal; and a downlink receiver adapted to receive the modulated echo signals from said downlink transmitters and to supply a plurality of demodulated echo signals to a processing unit.

36. A method for performing ultrasonic, wireless measurements, said method comprising:

transmitting at least one modulated timing pulse signal, each modulated timing pulse signal being transmitted over a respective uplink wireless channel, wherein the at least one modulated timing pulse signal comprises a timing pulse signal modulated using an uplink carrier signal;

receiving the modulated timing pulse signal over the uplink wireless channel and supplying a respective demodulated timing pulse signal to a respective transducer;

receiving an echo signal from the respective transducer, extracting an envelope information signal from the echo signal, and transmitting a respective modulated echo signal over a respective downlink channel, wherein the modulated echo signal is modulated using a downlink carrier signal; and receiving the modulated echo signal and supplying a respective demodulated echo signal to a processing unit.

37. The method of claim 36 further comprising:

modulating a timing pulse signal using the uplink carrier signal to supply the modulated timing pulse signal;

demodulating the modulated timing pulse signal to supply the respective demodulated timing pulse signal;

modulating the envelope information signal to supply the respective modulated echo signal; and demodulating the modulated echo signal using the downlink carrier signal to supply the respective demodulated echo signal, wherein said modulation steps and said demodulation steps employ one of AM, FM, FSK, and CPSK modulation and demodulation, respectively.

38. The method of claim 37, wherein said timing pulse modulation and demodulation steps employ the uplink carrier signal in an ISM band, and wherein said echo signal modulation and demodulation steps employ the downlink carrier signal in the ISM band.

* * * * *